(12) United States Patent
Aboughanaima et al.

(10) Patent No.: US 8,917,629 B2
(45) Date of Patent: *Dec. 23, 2014

(54) METHOD AND APPARATUS FOR DETECTING DEVICES ON A LOCAL AREA NETWORK

(71) Applicant: Vonage Network LLC, Holmdel, NJ (US)

(72) Inventors: Mabrouk Aboughanaima, Matawan, NJ (US); Deepak Ottur, Hillsborough, NJ (US)

(73) Assignee: Vonage Network LLC, Holmdel, NJ (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/668,278

(22) Filed: Nov. 4, 2012

(65) Prior Publication Data

US 2013/0080629 A1    Mar. 28, 2013

Related U.S. Application Data

(63) Continuation of application No. 12/699,663, filed on Feb. 3, 2010, now Pat. No. 8,305,933.

(51) Int. Cl.
*H04L 12/28* (2006.01)
*H04L 29/08* (2006.01)
*H04L 29/12* (2006.01)
*H04L 29/06* (2006.01)
*H04M 7/00* (2006.01)

(52) U.S. Cl.
CPC .......... *H04L 67/16* (2013.01); *H04L 29/12066* (2013.01); *H04L 29/12452* (2013.01); *H04L 61/1511* (2013.01); *H04L 61/2546* (2013.01); *H04L 65/1073* (2013.01); *H04M 7/0075* (2013.01); *H04L 65/1059* (2013.01)
USPC .......................................................... 370/254

(58) Field of Classification Search
USPC ........................................ 370/254; 709/223
See application file for complete search history.

(56) References Cited

U.S. PATENT DOCUMENTS

| | | |
|---|---|---|
| 2004/0109414 A1 | 6/2004 | Choi et al. |
| 2006/0268829 A1 | 11/2006 | Nedeltchev |
| 2008/0148378 A1 | 6/2008 | Wing et al. |
| 2009/0198804 A1 | 8/2009 | Danforth et al. |
| 2009/0203331 A1 | 8/2009 | Ranalli et al. |
| 2009/0323677 A1 | 12/2009 | Mehmood et al. |
| 2010/0325391 A1 | 12/2010 | Talla |
| 2010/0332680 A1 | 12/2010 | Anderson et al. |

*Primary Examiner* — Dang Ton
*Assistant Examiner* — Kevin Lee
(74) *Attorney, Agent, or Firm* — Moser Taboada; Joseph Pagnotta

(57) ABSTRACT

A method, apparatus, and system for discovering devices on a local area network. The method comprises sending a DNS request from a host networking element, receiving the DNS request at one or more devices, and responding to the host networking element with one or more DNS responses. The DNS request comprises one or more particular domain names. The one or more DNS responses comprise local network address information for the one or more VoIP devices. The apparatus comprises means for filtering a set of network traffic for a DNS request, means for responding to a DNS request with a local network address, and means for forwarding the DNS request to another device. The system comprises a computer for generating a DNS request for a particular domain, and one or more VoIP devices for receiving the DNS request and sending a DNS response to the computer with a local network address for the VoIP device.

15 Claims, 9 Drawing Sheets

United States Patent

METHOD AND APPARATUS FOR DETECTING DEVICES ON A LOCAL AREA NETWORK

CROSS-REFERENCE TO RELATED APPLICATIONS

This application is a continuation of U.S. patent application Ser. No. 12/699,663, filed Feb. 3, 2010. The aforementioned related patent application is herein incorporated by reference in its entirety.

BACKGROUND OF THE INVENTION

1. Field of the Invention

Embodiments of the present invention generally relate to computer networks and, more particularly, to a method and apparatus for detecting Voice-over Internet Protocol (VoIP) devices on a computer network.

2. Description of the Related Art

Ubiquitous broadband internet access provides consumers with more options for communication than ever before. The high bandwidth provided by computer networks provides an ideal platform for the transmission of telephony data. Voice over Internet Protocol (VoIP) systems allow users to connect telephony devices to exchange telephony information via a computer network instead of a Plain Old Telephone System (POTS).

Such VoIP systems may advantageously interface with other devices connected to the home network. However, in order to enable this interface, the computer must be aware of the VoIP system on the network. Current broadcast and multicast techniques for device detection require the VoIP system to be designed with specially configured ports or internet protocol (IP) addresses. Furthermore, many routers and gateways are designed with firewalls and filters that frustrate such methods of device discovery. Finally, such methods are inefficient—consuming memory space and processor cycles on devices where such resources are at a premium. Therefore, there is a need in the art for an improved method and apparatus for detecting devices on a local area network (LAN).

SUMMARY OF THE INVENTION

Embodiments of the present invention comprise a method, apparatus, and system for discovering devices on a local area network. Embodiments of the method comprise sending a Domain Name Server (DNS) request from a host networking element, receiving the DNS request at one or more devices, and responding to the computer with one or more DNS responses. The DNS request comprises one or more particular domain names. The one or more DNS responses comprise local network address information for the one or more VoIP devices.

Embodiments of the apparatus comprise means for filtering a set of network traffic for a DNS request, means for responding to a DNS request with a local network address, and means for forwarding the DNS request to another device.

Embodiments of the system comprise a host networking element for generating a DNS request for a particular domain, and one or more VoIP devices for receiving the DNS request and sending a DNS response to the computer with a local network address for the VoIP device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for detecting devices on a local area network is described herein. The inventive method and apparatus advantageously provide for the discovery of particular devices within a network using DNS requests. DNS is a standard protocol present within the Internet Protocol (IP) communications suite for resolving text uniform resource locators (URL) into IP addresses. For example, when a user enters a text address (e.g. www.yahoo.com) into a web browser, the web browser sends a DNS request with the text address to a DNS server. The DNS server responds with a DNS response containing the IP address (e.g. 69.147.76.15) associated with the text address.

Using DNS lookups for network device discovery minimizes the device resources required to perform the discovery operation. Furthermore, embodiments of the invention advantageously do not require a particular IP address or port configuration for the detected devices. Additionally, since the method operates using standard DNS requests, embodiments of the invention are not frustrated by packet filters or firewalls that may be present on the network.

Figure 1:
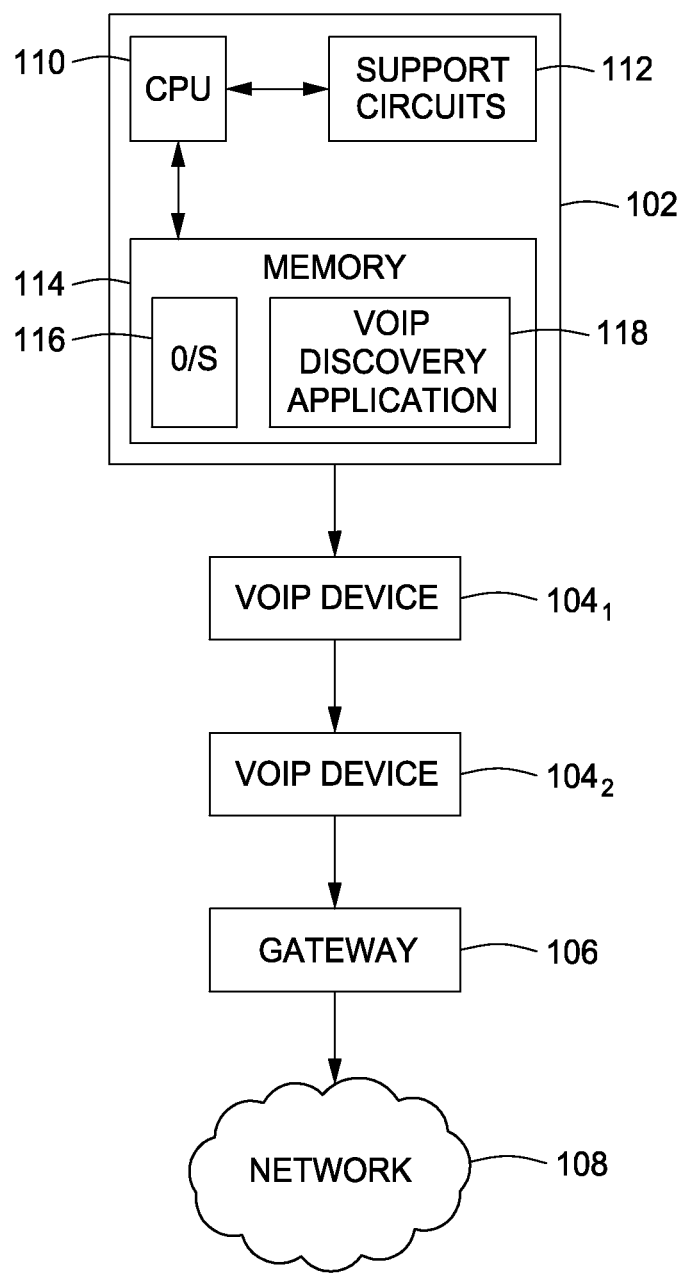
FIG. 1 is a block diagram depicting a computer network in accordance with embodiments of the present invention.

FIG. 1 depicts a local area network 100 in which embodiments of the present invention are performed. The local area network 100 comprises a host networking element 102, one or more VoIP devices 104, a gateway 106, and a network 108. The host networking element 102, VoIP devices 104, and the gateway 106 are coupled to a local area network as generally known in the art. While the local area network 100 is discussed with respect to the Internet Protocol suite of communication protocols, one of ordinary skill in the art would recognize that embodiments of the invention would be operable using any set of communication protocols that contain an implementation of DNS for address resolution.

The host networking element 102 is represented in the form of a general purpose computer such as those generally known in the art. The host networking element 102 may include a central processing unit (CPU) 110, support circuits 112, and memory 114. The CPU 110 may comprise one or more commercially available microprocessors or microcontrollers that facilitate data processing and storage. The various support circuits 112 are utilized to facilitate the operation of the CPU 110 and include such circuits as clock circuits, power supplies, cache, input/output (I/O) circuits and devices, modulation/demodulation devices, human interface devices, and the like.

The memory 114 may comprise random access memory, read only memory, removable storage, optical disk storage, disk drive storage, flash memory, and combinations thereof. The memory 114 stores an operating system 116 and a VoIP discovery application 118. In operation, the CPU 110 executes the operating system 116 to control the general utilization and functionality of the host computer. The VoIP discovery application 118 operates to determine the presence of one or more VoIP devices 104 on the network 100. In some embodiments, the VoIP discovery application 118 is incorporated into a software application capable of interfacing with the VoIP device 104. In other embodiments, the VoIP discovery application 118 is a standalone application that informs other applications of the presence of the VoIP device 104. One of ordinary skill in the art would recognize that such a VoIP discovery application 104 may be implemented as a component of the operating system 116, as a device driver, as part of a separate application, or in any other type of software as commonly known in the art.

The local area network 100 further comprises one or more VoIP devices 104. The VoIP device 104 couples to the local area network 100 to provide internet telephony service. The VoIP device 104 provides an interface for a phone (not shown) so that a user may connect to the phone to the VoIP device to enable voice service. The VoIP device 104 transmits and receives telephony signals to a remote server over the network 100 via the gateway 106. In some embodiments the VoIP device 104 provides a subscriber line interface circuit (SLIC) for interfacing with standard twisted pair phone cable. In some embodiments, the VoIP device 104 communicates wirelessly with IP phones designed to be used with a VoIP system. Examples of such VoIP devices 104 include the VDV21-VD router and VDV21-CVR wireless IP phone system, available from Vonage Holdings Corporation of Holmdel, N.J. The VoIP devices 104 may include a LAN port and a wide area network (WAN) port for configuring the network topology. In one configuration, the host networking element 102 is coupled to the LAN port, and the next network device in the network configuration is coupled to the WAN port. As depicted in FIG. 1, the VoIP devices $104_1$ and $104_2$ are connected in series, also known as a "daisy-chain" configuration.

The network 100 further comprises a gateway 106 and network 108. The gateway 106 provides an interface with a larger network 108. In some embodiments, the gateway 106 is a router as commonly known in the art. In some embodiments, the gateway 106 is a broadband modem for communication with the Internet. The network 108 refers to any packet switched network connected to the local area network 100. In some embodiments, the network 108 is the Internet. The VoIP device 104 communicates to a remote server (not shown) via the network 108 to provide telephony service.

Figure 2:
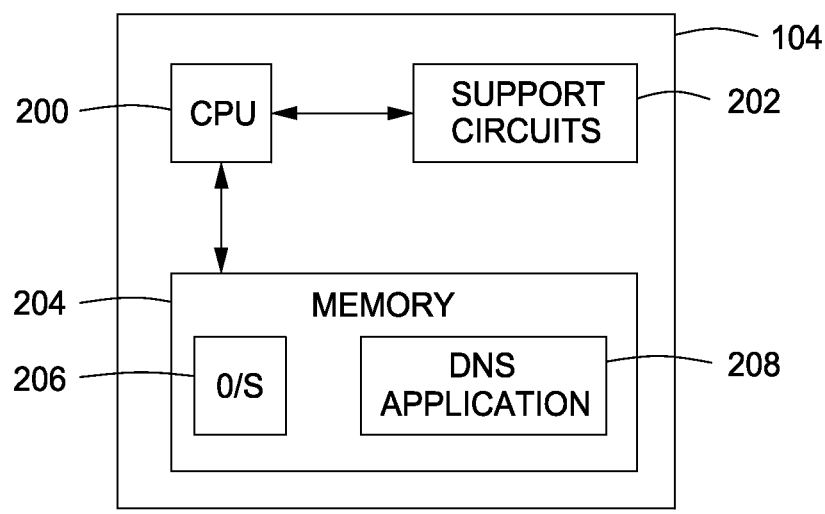
FIG. 2 is a block diagram of a VoIP device using embodiments of the present invention.

FIG. 2 depicts a detailed view of a VoIP device 104 in accordance with embodiments of the present invention. The VoIP device 104 generally comprises a CPU 200, support circuits 202, and a memory 204. The CPU 200 may comprise one or more commercially available microprocessors or microcontrollers that facilitate data processing and storage. The various support circuits 202 are utilized to facilitate the operation of the CPU 200 and include such circuits as clock circuits, power supplies, cache, input/output (I/O) circuits and devices, modulation/demodulation devices, human interface devices, SLICs, and the like.

The memory 204 may comprise random access memory, read only memory, removable storage, optical disk storage, disk drive storage, flash memory, and combinations thereof. The memory 204 stores an operating system 206, and a DNS application 208. In operation, the CPU 110 executes the operating system 116 to control the general utilization and functionality of the VoIP device 104.

The memory 204 is further comprised of a DNS application 208. The DNS application 208 functions as a DNS server for the purpose of responding to and forwarding DNS requests to identify the device 104 to the network device that initiated the DNS request. This process is discussed in further detail with respect to FIGS. 3 and 4.

Figure 3:
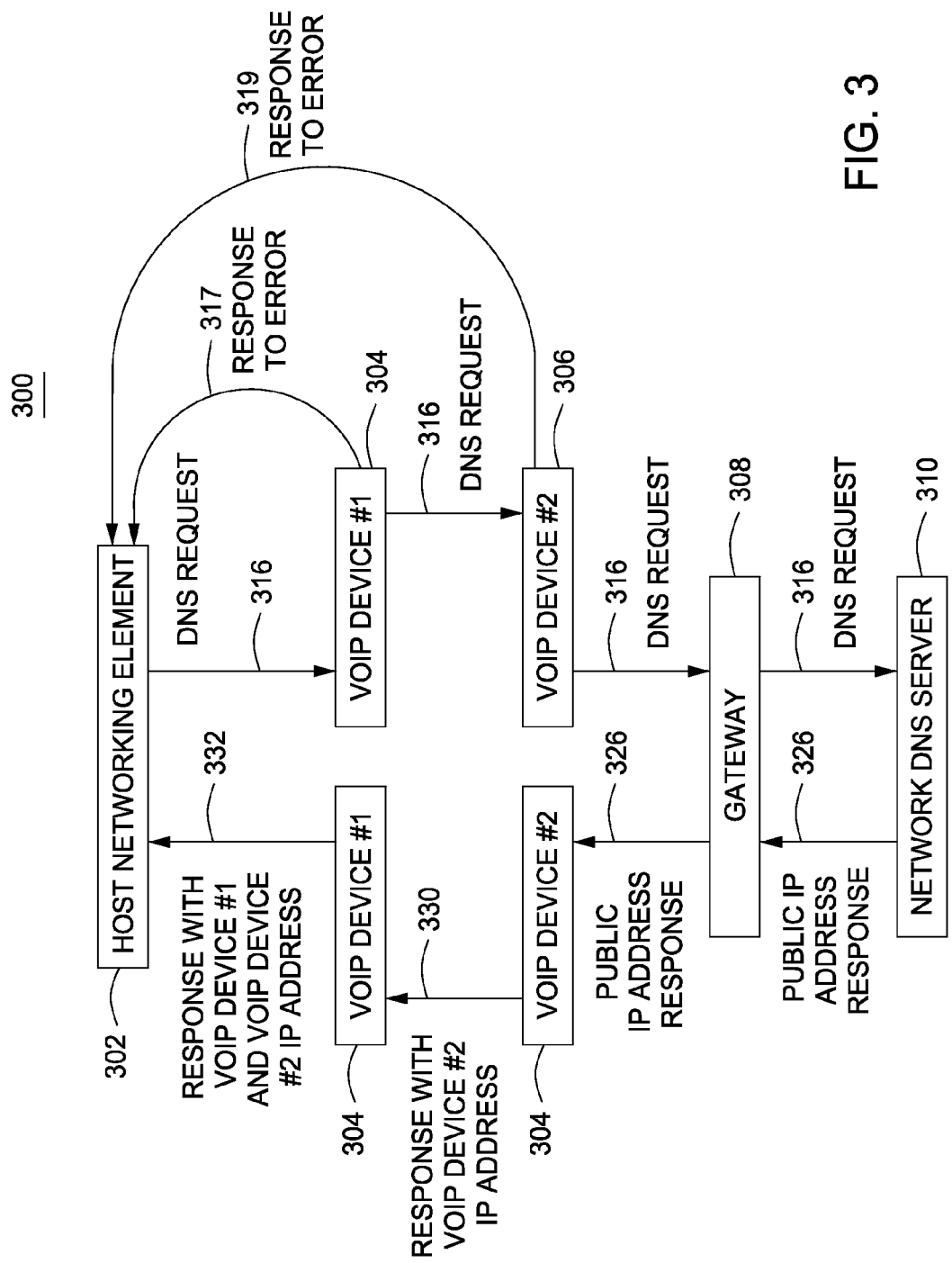
FIG. 3 is a functional diagram of Domain Name System (DNS) request propagation throughout a computer network using in accordance with embodiments of the present invention.

FIG. 3 depicts a functional diagram of DNS request/response propagation 300 throughout a local area network 100 as disclosed with respect to FIG. 1 in accordance with embodiments of the present invention. A host networking element (i.e., computer) 302 issues a DNS request 316 for a particular domain associated with the VoIP system in use on the network (e.g. vdv21DeviceAPI.org).

The DNS request 316 propagates through the network until it reaches VoIP device #1 304. VoIP device #1 304 filters incoming network traffic for DNS requests such as the DNS request 316. When the DNS request 316 is received, VoIP device #1 304 parses the DNS request 316 to determine if the particular domain associated with the VoIP system is present. VoIP device #1 304 notes whether the DNS request 316 contains the particular domain name. VoIP device #1 304 then forwards the DNS request 316 to the next device on the network, VoIP device #2 306. If the VoIP device 304 receives an error when sending the DNS request 316 (e.g. a timeout error, or any other error indicating the network DNS server 310 is unreachable or incapable of generating a DNS response), then VoIP device #1 304 generates an error response 317. The error response 317 includes the local address of VoIP device #1 304. In this manner, the VoIP device is advantageously still discoverable by the host networking element 302 even if the network DNS server 310 is unreachable.

When VoIP device #2 306 receives the request 316 from VoIP device #1 304, VoIP device #2 306 performs the same processing logic as VoIP device #1 304. The DNS request 316 is then forwarded to the gateway 308. The same error processing logic as used by VoIP device #1 304 applies. If the VoIP device #2 306 receives an error when generating or forwarding the DNS request 316, VoIP device #2 306 generates an error response 319, returning the local address for VoIP device #2 306 as a DNS response 319 to the previous device in the chain. This response propagates to the host networking element 302 such that VoIP device #2 306 is discoverable even if the DNS network server 310 is unreachable.

The gateway 308 receives the DNS request 316 and forwards such request 316 to a network DNS server 310. The network DNS server 310 is a DNS server as commonly known in the art, generally supplied by an Internet Service Provider (ISP) or network administrator. The network DNS server 310 responds to the DNS request with public IP address response 326 containing the IP address associated with the domain name requested in the initial DNS request 316.

The gateway 308 then responds to VoIP device #2 306 with the public IP address response 326. If the original DNS request 316 contained the particular domain name associated with the VoIP devices, the VoIP device #2 306 processes the DNS response by appending the local IP address associated with the VoIP device #2 306 to the DNS response 326. VoIP device #2 306 then forwards an updated DNS response 330 with the local IP address of VoIP device #2 306 appended to VoIP device #1. If the original DNS request 316 did not contain the particular domain name associated with the VoIP devices, the VoIP device #2 306 forwards the response without appending the local IP address. It should be noted that the VoIP devices do not interfere with normal DNS requests and responses, and only append to DNS messages in the manner described when the DNS message contains the particular domain name associated with the devices.

VoIP device #1 304 receives the updated DNS response 330 with the VoIP device #2 IP address appended. As above, if the original DNS request 316 contained a particular domain associated with the VoIP devices, then VoIP device #1 304 appends the local IP address associated with VoIP device #1 304. The DNS response with all IP addresses 332 is then forwarded to the host networking element 302.

The host networking element 302 receives the DNS response with all IP addresses 332 and filters out the public IP address received from the network DNS server 310. The remaining IP addresses stored in the DNS response 332 represent the IP addresses of the VoIP devices located on the local area network 100.

Figure 4:
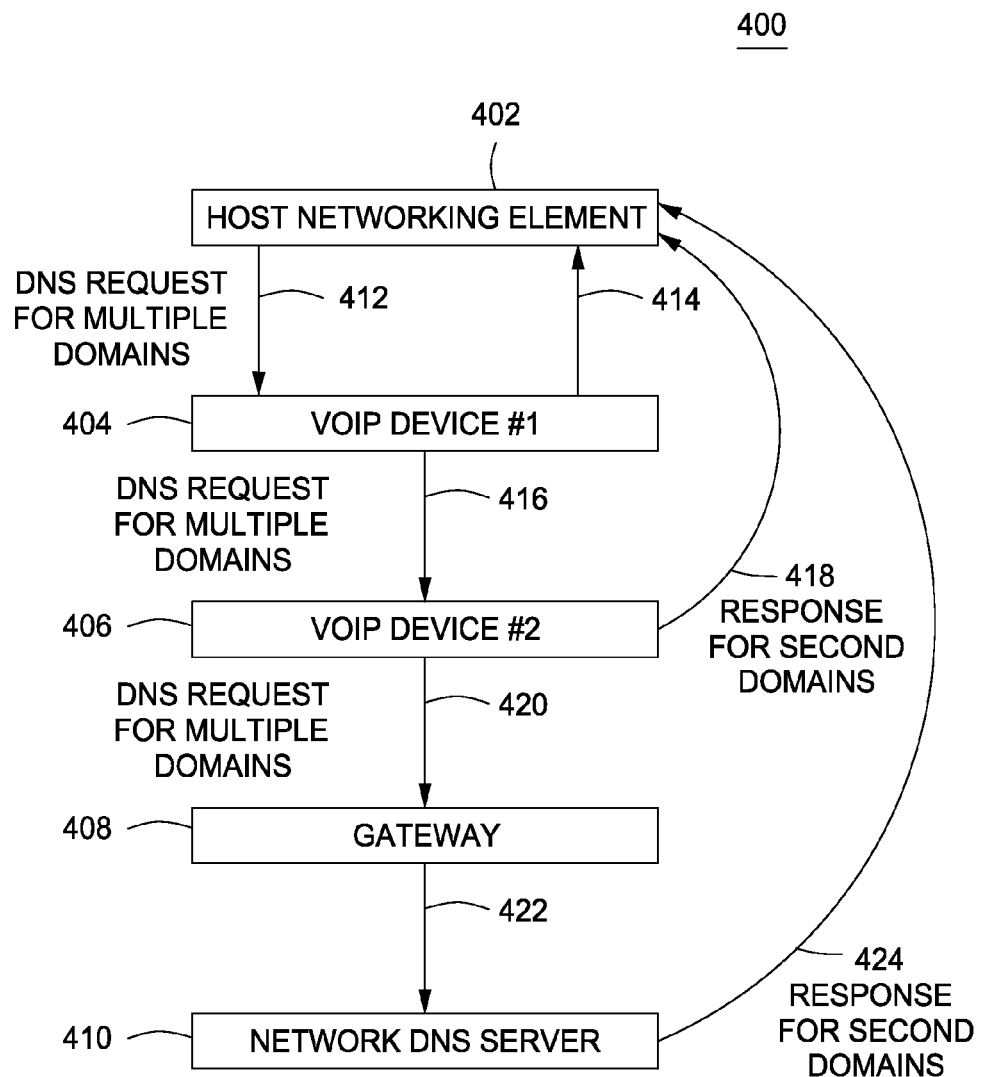
FIG. 4 is a functional diagram of DNS request propagation throughout a computer network in accordance with embodiments of the present invention.

FIG. 4 is a functional diagram depicting a method for discovering devices on a local area network 100 using a DNS request in accordance with embodiments of the present invention. The host computer 402 generates one or more DNS requests 412 for one or more domains in a sequential list associated with a VoIP system (e.g. vdv21DeviceAPI1.org, vdv21DeviceAPI2.org, and vdv21DeviceAPI3.org). The request 412 is sent to VoIP device #1 404.

VoIP device #1 404 receives the request 412 for the one or more domains, and responds to the first domain request in the sequential list (e.g. vdv21DeviceAPI1.org) with the local IP address of VoIP device #1 404. This response 414 is sent to the requesting host computer 402. VoIP device #1 404 then forwards on the remaining DNS requests 416 to the next device on the network, VoIP device #2 406.

VoIP device #2 406 receives the remaining DNS requests 416. VoIP device #2 406 responds to the next domain request in the remaining sequential list (e.g. vdv21DeviceAPI2.org) by sending response 418 to the requesting host computer 402. The response 418 includes the IP address of VoIP device #2 406. The remaining unanswered requests 420 are forwarded. This response 418 containing the IP address of VoIP device #2 406 is sent, either directly or via VoIP device #1, to the host computer 402.

The gateway 408 receives the forwarded DNS request(s) for any remaining domains 420, which contains the remainder of the sequential list (e.g. only vdv21DeviceAPI3.org, at this point). The gateway 408 forwards this DNS request(s) 420 to a network DNS server 410. If the DNS request(s) are unable to reach the network DNS server 410, then the method will still succeed in determining the presence of any VoIP devices on the network, because the response is advantageously sent to the host networking element 402 prior to the forwarding of the DNS request. The network DNS server 410 generates a DNS response 424 containing public IP addresses for any domains not responded to by the VoIP devices 404 and 406 that are part of the local area network (e.g. network 100).

When the host networking element 402 receives the DNS responses 414, 418, and 424, the host computer 402 filters any responses that contain public IP addresses received from a network DNS server 410. The remaining unfiltered responses correspond to the IP addresses of the VoIP devices 404 and 406 present on the network 100.

Figure 5:
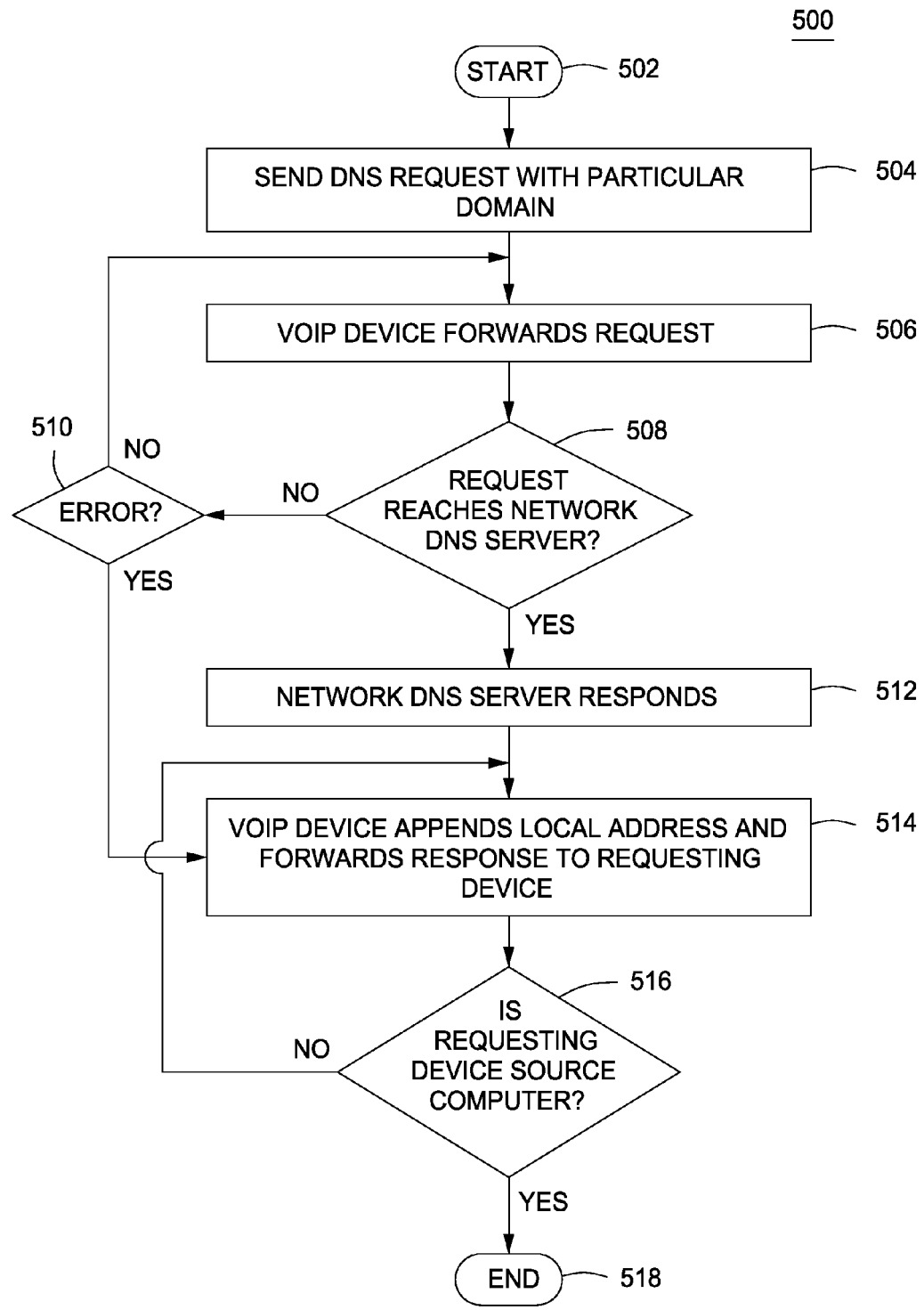
FIG. 5 is a flow diagram depicting a method for detecting devices using a single domain request on a local area network in accordance with embodiments of the present invention.

FIG. 5 depicts a flow diagram of a method 500 for discovering devices on a local area network in accordance with embodiments of the present invention. The method begins at step 502 with a host networking element 102 connected to a local area network via the LAN port on a VoIP device 104. At step 504, the computer sends a DNS request for the address of a particular domain (e.g. vdv21DeviceAPI.org).

At step 506, the VoIP device 104 is filtering network traffic for DNS requests. The VoIP device 104 intercepts the DNS request. If the DNS request contains the appropriate particular domain, then the VoIP device 104 generates a new request with the VoIP device 104 as the originator. If the DNS request does not contain the particular domain, the DNS request is forwarded without modification. Whether or not the request is modified, it is then forwarded to the next device on the network.

At step 508, the DNS request is forwarded through the network, reaching all of the VoIP devices 104. Each VoIP device 104 performs the same logic when receiving the DNS request. When the DNS request is forwarded to the next device, it will have either reached the network DNS server or not. If the request reaches the DNS server, the method proceeds to step 512. If the request does not reach the DNS server, the method proceeds to step 510.

At step 510, a decision is made as to why the DNS request has failed to reach the DNS server. This failure may occur because the request is received by another VoIP device, or it may occur because of an error. If the device receives an error, such as a timeout or another error indicating the DNS server is unreachable, then the method proceeds to step 514 to generate a response to the host networking element. This advantageously allows for the discovery of VoIP devices on a network that is not connected to a network DNS server. Otherwise, the request may fail to reach the network DNS server because a next VoIP device has filtered the request and generated a new request to be forwarded. If this is the case, then the method proceeds to step 506 and the new request is generated in the same manner.

At step 512, the network DNS server receives the request. The network DNS server then performs a standard DNS resolution operation to look up the address entries associated with the domain. In some embodiments, the VoIP device manufacturer may register a public address corresponding to the particular domain. The DNS server then responds to the most recent requester at step 514.

At step 514, the VoIP device 104 receives the DNS response from the network DNS server. The VoIP device 104 then appends the local IP address associated with that device to the list of addresses contained within the DNS response. At step 516, this process continues until all VoIP devices 104 have appended their associated local IP addresses to the response and the response reaches the requesting host networking element 102.

The method ends at step 518, when the requesting host networking element 102 has received the DNS response containing the addresses of each VoIP device 104 that the DNS request passed through. According to some embodiments, the requesting host networking element 102 filters out the public address(es) received from the network DNS server.

Figure 6:
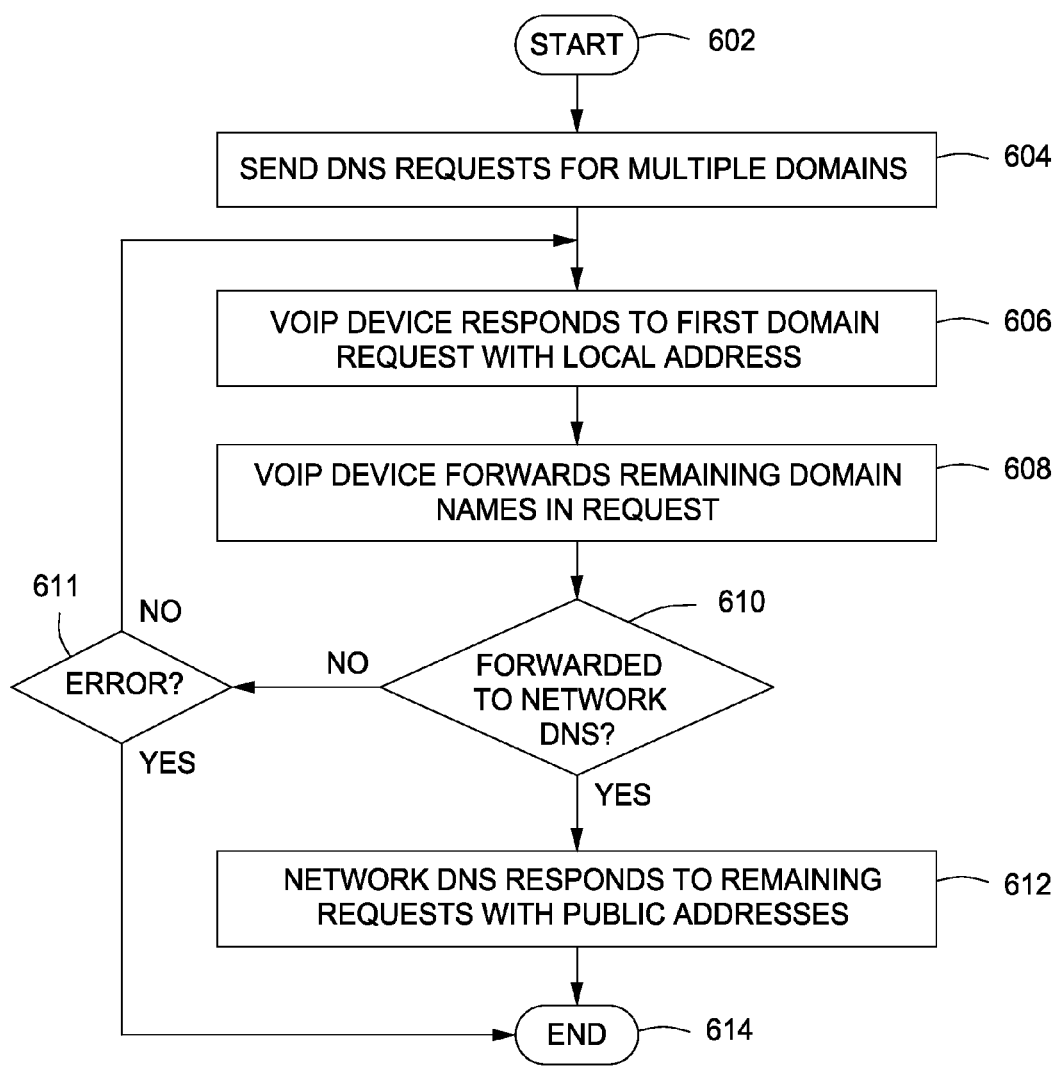
FIG. 6 is a flow diagram depicting a method for detecting devices on a local area network using multiple domain requests on a local area network in accordance with embodiments of the present invention.

FIG. 6 depicts a flow diagram of a method 600 for discovering devices on a local area network in accordance with embodiments of the present invention. The method begins at step 602 with a host networking element 102 connected to a local area network via the LAN port on a VoIP device 104. At step 604, the computer sends a DNS request for the address of multiple particular domains associated with the VoIP system (e.g. vdv21DeviceAPI1.org, vdv21DeviceAPI2.org, vdv21DeviceAPI3.org). The domains within the DNS request are ordered in a particular sequential order known to the one or more VoIP devices 104 connected to the network.

At step 606, the VoIP device 104 responds to the DNS request by associating the VoIP device's local IP address with the first sequential domain name in the DNS request. For example, the VoIP device 104 would respond to the host networking element 102 with a DNS response associating vdv21DeviceAPI1.org with its own local address (e.g. 192.168.1.1). According to some embodiments, the DNS response is sent directly to the requesting host networking element 102. According to some embodiments, the DNS response is sent to the previous requesting device in the chain (e.g. another VoIP device), where the response is forwarded to the next previous requesting device until it reaches the requesting host networking element 102.

The VoIP device 104 then removes the first sequential domain name from the DNS request, such that the second domain name in the list becomes the first domain name, the third domain name in the list becomes the second domain name, etc.

At step 608, the VoIP device 104 forwards the updated DNS request with the newly reordered domain name list to the next device in the network. At step 610, if the request is forwarded to the network DNS server, then the method proceeds to step 612. If the request does not reach the network DNS server, then the method proceeds to step 611.

The DNS request may fail to reach the DNS server at step 610. This failure may occur because the request is received by another VoIP device, or it may occur because of an error. If the device receives an error, such as a timeout or another error indicating the DNS server is unreachable, then the method proceeds to step 614 to terminate, as the host networking element has already received a response identifying the VoIP device on the network. This advantageously allows for the discovery of VoIP devices on a network that is not connected to a network DNS server. Otherwise, the request may fail to reach the network DNS server because a next VoIP device has filtered the request and generated a new request to be forwarded. If this is the case, then the method proceeds to step 606 and the new request is generated in the same manner.

At step 612, the network DNS server receives the request. The network DNS server then responds with the addresses associated with the remaining domain names within the DNS request. These addresses are contained within a DNS response that is forwarded to the requesting host networking element 102 in the same manner as the DNS response from the VoIP device 104 that occurs at step 606.

The method ends at step 614, where the requesting host networking element 102 has received the addresses of each VoIP device 104 within the network, along with public addresses associated with any domain names that were resolved by the network DNS server. These addresses are used to determine the addresses of VoIP devices 104 within the network in the same manner as to step 518 of the method discussed with respect to FIG. 5.

Figure 7:
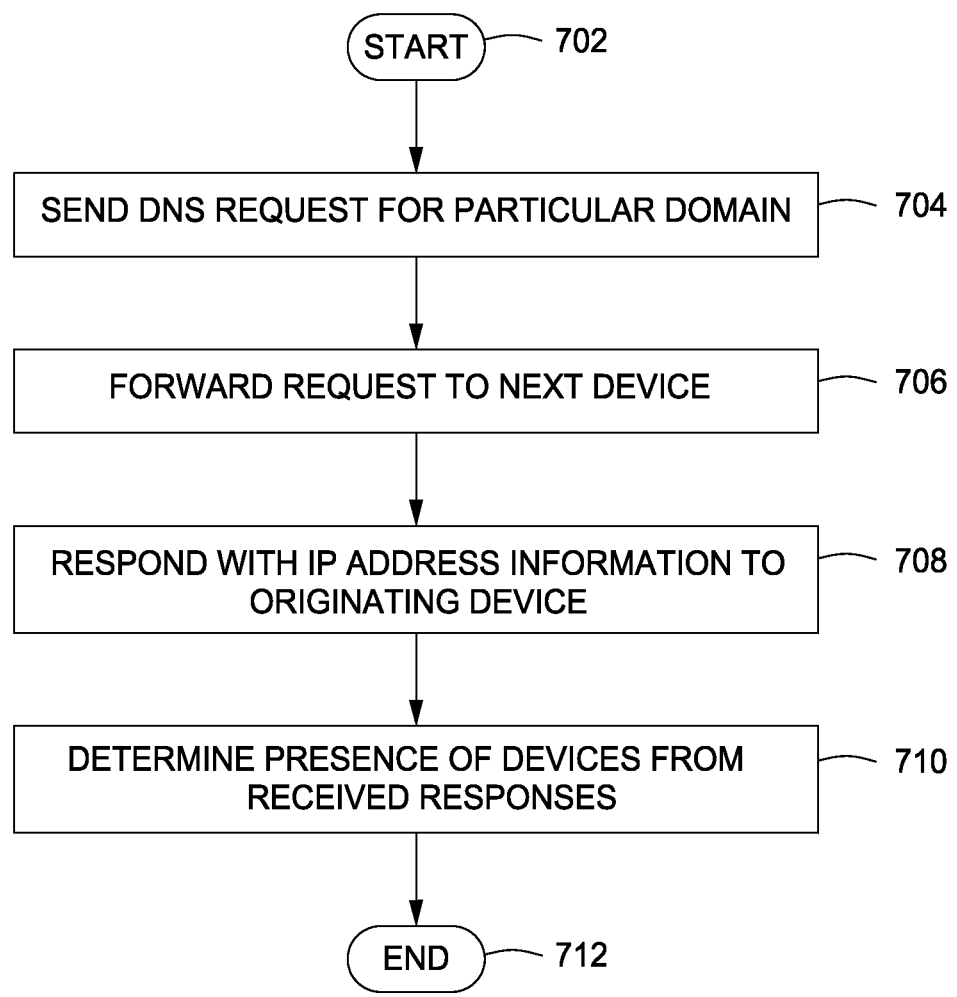
FIG. 7 is a flow diagram depicting a method of detecting devices on a local area network using DNS requests in accordance with embodiments of the present invention.

FIG. 7 depicts a flow diagram of a method 700 for discovering devices on a local area network in accordance with embodiments of the present invention. The method begins at step 702 with a host networking element 102 and one or more VoIP devices 104 coupled to a local area network 100.

At step 704, the host networking element 102 sends a DNS request with one or more particular domain names associated with a VoIP system. The request is a standard DNS request as known in the art. The DNS request propagates throughout the network until it reaches a VoIP device 104 at step 706.

At step 706, the VoIP device 104 receives the DNS request containing the particular domain name. The VoIP device 104 filters the DNS request to determine if it contains the particular domain name associated with the VoIP system. At step 708, if the DNS request contains the particular domain name, the VoIP device 104 responds to the host networking element 102 with local address information associated with the VoIP device 104 (e.g. the device's IP address). If the DNS request does not contain the particular domain name, then the DNS request is forwarded to the next network device without generating a DNS response.

At step 710, the host networking element 102 determines the presence of VoIP devices 104 on the network from the DNS responses received from the devices 104. Each VoIP device 104 in series between the host networking element 102 and any network DNS server will generate such a response. The host networking element 102 then uses the DNS responses to obtain the local addresses of the VoIP devices 104 present on the network.

The method ends at step 712, with the host networking element aware of all VoIP devices 104 on the network that sent DNS response messages.

Figure 8:
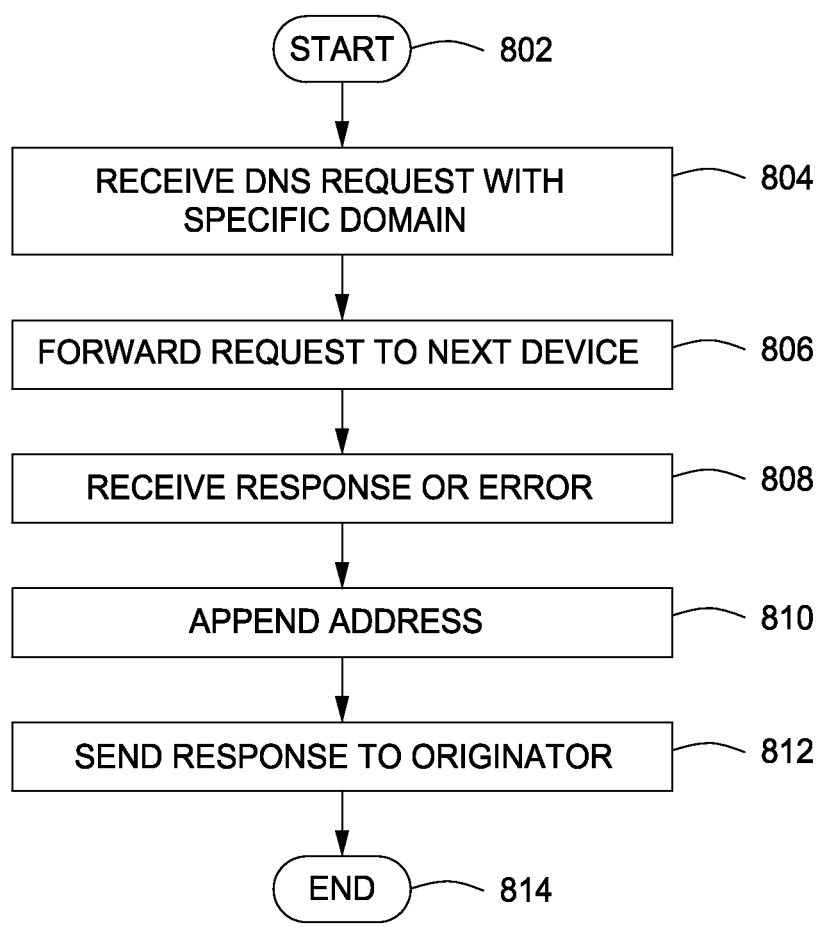
FIG. 8 is a flow diagram depicting the functional operation of a VoIP device present on a system executing a method for detecting network devices using DNS requests in accordance with embodiments of the present invention.

FIG. 8 is a flow diagram depicting an embodiment of a method 800 for the operation of an example VoIP device 104 operating to provide discovery information in accordance with embodiments of the present invention. At step 802, the method 800 begins with the device 104 present on the network. At step 804, the VoIP device 104 receives a DNS request for a specific domain name (e.g. vdv21DeviceAPI.org). DNS requests that do not contain the specific domain name are forwarded in a manner consistent with the DNS protocol. At step 806, the device 104 forwards the request to the next device in the network.

At step 808, the VoIP device 104 receives either a DNS response or an error occurs (e.g. a DNS timeout error or some other error indicating the VoIP device 104 will not be receiving a DNS response). Once the VoIP device 104 receives either a response or an error, the method proceeds to step 810.

At step 810, the device 104 appends its local address to a response message. This response message may be a valid DNS response received from another device on the network, or the message may be newly generated if the device 104 received an error. In both cases, at step 812 the device 104 forwards a DNS response with an appended local address to the network element from which the original request was received at step 804. The method 800 ends at step 814 when the DNS request with local address appended has been sent to the originating network element.

Figure 9:
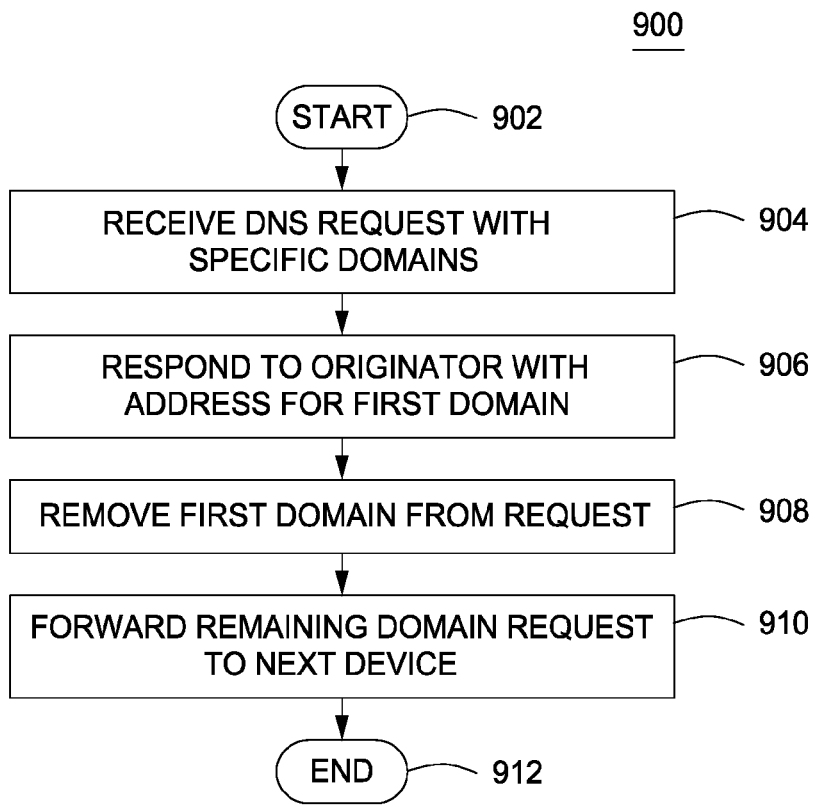
FIG. 9 is a flow diagram depicting another functional operation of a VoIP device present on a system executing a method for detecting network devices using DNS requests in accordance with embodiments of the present invention.

FIG. 9 is a flow diagram depicting an embodiment of a method 900 for the operation of an example VoIP device 104 operating to provide discovery information in accordance with embodiments of the present invention. At step 902, the method 900 begins with the device 104 present on the network. At step 904, the VoIP device 104 receives a DNS request for a list of one or more specific domains (e.g. vdv21DeviceAPI.org, vdv21DeviceAPI1.org, vdv21DeviceAPI2.org, etc.). At step 906, the device 104 responds to the originating device with a local address for one of the domains in the list. In some embodiments, the domain responded to may be the first element of the list, but one of ordinary skill in the art would recognize that the device may respond to any particular element. In some embodiments, the device 104 may respond to a particular domain indicating the type or configuration of the device 104.

At step 908, the device 104 removes the first element from the list. As above, the description of a "first" element of the list is offered as an example of one particular embodiment of the method, and one of ordinary skill in the art would recognize that other methods of choosing the element to remove would also be valid. At step 910, the request with the list containing the remaining domain names is then forwarded to the next network element. The method 900 ends at step 912, when the request containing the domain name list has been forwarded.

Figure 10:
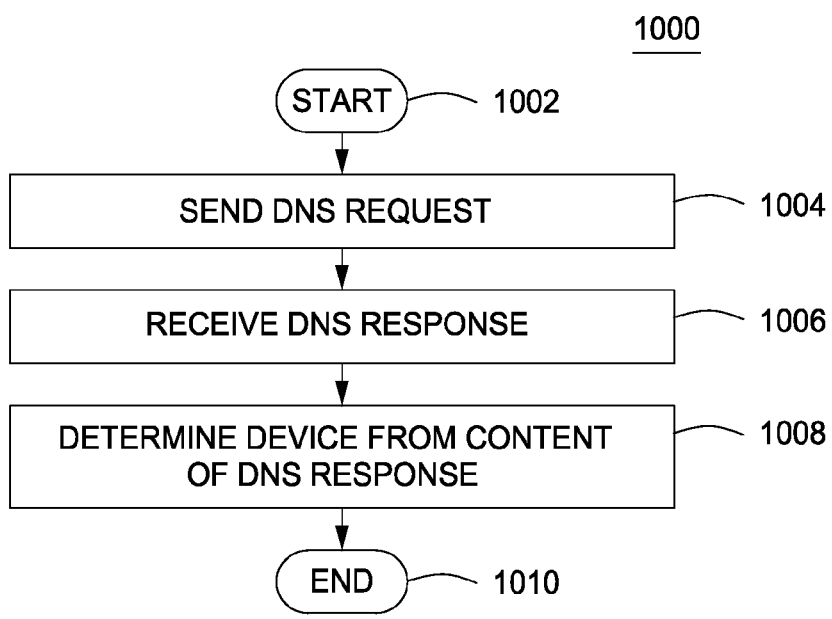
FIG. 10 is a flow diagram depicting the functional operation of a host networking element present on a system executing a method for detecting network devices using DNS requests in accordance with embodiments of the present invention.

FIG. 10 is a flow diagram depicting an embodiment of a method 1000 for operation of a host networking element 102 acting in accordance with embodiments of the present invention. The method 1000 begins at step 1002 with a host networking element 102 connected to a network. At step 1004, the networking element 102 sends a DNS request containing one or more specific domain names. At step 1006, the host networking element 102 receives a DNS response to the DNS request sent at step 1004. At step 1008, the host networking element 102 performs analysis on the DNS response to determine the presence of one or more particular devices present on the network. For example in some embodiments, the host networking element 102 may determine which IP addresses are valid for local devices by determining whether the IP address corresponds to a private (i.e. non-routable) address, or a public (i.e. routable) address. If the IP address is private, then it corresponds to a local network device. If the IP address is public, then it corresponds to a common public address received from a network DNS server. The method ends at step 1010.

While the foregoing is directed to embodiments of the present invention, other and further embodiments of the invention may be devised without departing from the basic scope thereof, and the scope thereof is determined by the claims that follow.

The invention claimed is:

1. A method for discovering Internet Protocol (IP) devices on a network using domain name service (DNS) requests, the method comprising:
    sending, to an IP device, a DNS request originating from a host networking element, the DNS request comprising a list of one or more particular domain names corresponding to an IP network;
    receiving a DNS response from the IP device associating a first domain name on the list with at least a local network address of the IP device;
    providing for the removing of the first domain name on the list;
    providing for the forwarding of the DNS request to a next IP device on the network; and
    receiving one or more additional DNS responses, wherein the one or more additional DNS responses comprise local network address information for one or more additional IP devices associated with remaining domain names on the list.

2. The method of claim 1, wherein the IP device is a wireless IP device.

3. The method of claim 1, further comprising forwarding the DNS request to the next IP device on the network.

4. The method of claim 3, further comprising forwarding the DNS request to a network DNS server.

5. The method of claim 4, further comprising receiving a DNS response from the network DNS server.

6. The method of claim 1, further comprising receiving the DNS response with each of the local network addresses of the one or more IP devices at the host networking element.

7. The method of claim 1, further comprising determining the presence of the one or more IP devices at the host networking element from the received DNS response.

8. The method of claim 1, further using the host networking element to determine the presence of the one or more IP devices from the DNS responses.

9. The method of claim 1, further comprising filtering the DNS request for the particular domain name corresponding to the IP network.

10. An apparatus for discovering Internet Protocol (IP) devices on a computer network using domain name service (DNS) requests, the apparatus comprising:
    a) at least one processor; and
    b) at least one storage device storing processor-executable instructions which, when executed by the at least one processor, perform a method including
        sending, to an IP device, a DNS request originating from a host networking element, the DNS request comprising a list of one or more particular domain names corresponding to an IP network;
        receiving a DNS response from the IP device associating a first domain name on the list with at least a local network address of the IP device;
        providing for the removing of the first domain name on the list;
        providing for the forwarding of the DNS request to a next IP device on the network; and
        receiving one or more additional DNS responses, wherein the one or more additional DNS responses comprise a local network address of one or more additional IP devices associated with remaining domain names on the list.

11. The apparatus of claim 10, wherein the IP device is a wireless IP device.

12. The apparatus of claim 10, wherein the method further includes filtering a DNS request for a particular domain name associated with an IP network.

13. A method for discovering an Internet Protocol (IP) device on a network using domain name service (DNS) requests, the method comprising:
    receiving a DNS request from a host networking element, the DNS request comprising a plurality of particular domain names corresponding to an IP network;
    associating the IP device's local IP address with a first sequential domain name in the DNS request;
    sending a DNS response to the host networking element that includes the association of the IP device's local IP address with the first sequential domain name;
    updating the DNS request by removing the first sequential domain name from the DNS request such that a second domain name in the DNS request becomes the first domain name in the DNS request; and
    forwarding the updated DNS request to a next IP device in the IP network.

14. The method of claim 13, wherein the IP device is a wireless IP device.

15. The method of claim 13, further comprising forwarding the DNS request until it reaches a network DNS server.

\* \* \* \* \*